United States Patent
Luo et al.

(10) Patent No.: US 12,523,815 B2
(45) Date of Patent: Jan. 13, 2026

(54) DISPLAY PANEL AND TERMINAL

(71) Applicant: JRD COMMUNICATION (SHENZHEN) LTD., Guangdong (CN)

(72) Inventors: Guangyue Luo, Guangdong (CN); Bo Yang, Guangdong (CN); Su Luan, Guangdong (CN); Zhuolun Xie, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 618 days.

(21) Appl. No.: 17/996,929

(22) PCT Filed: May 13, 2020

(86) PCT No.: PCT/CN2020/089976
§ 371 (c)(1),
(2) Date: Oct. 22, 2022

(87) PCT Pub. No.: WO2021/212567
PCT Pub. Date: Oct. 28, 2021

(65) Prior Publication Data
US 2023/0176279 A1    Jun. 8, 2023

(30) Foreign Application Priority Data
Apr. 23, 2020  (CN) .......................... 202010325718.3

(51) Int. Cl.
*H10K 59/60* (2023.01)
*G02B 6/10* (2006.01)
*G02F 1/153* (2006.01)

(52) U.S. Cl.
CPC ............. *G02B 6/10* (2013.01); *G02F 1/1533* (2013.01); *G02F 2201/44* (2013.01)

(58) Field of Classification Search
CPC ....... G09G 2360/14–148; H10K 59/13; H10K 59/50; H10K 59/60; H10K 59/65
(Continued)

(56) References Cited

U.S. PATENT DOCUMENTS 10,267,976 B1    4/2019  Zheng et al.
10,534,221 B1 *  1/2020  Zhu ................... G02F 1/133602
(Continued)

FOREIGN PATENT DOCUMENTS

CN    106970440 A    7/2017
CN    108427228 A    8/2018
(Continued)

OTHER PUBLICATIONS

European Search Report in European application No. 20932648.7, mailed on Apr. 3, 2024.
(Continued)

*Primary Examiner* — Anthony J Daniels
(74) *Attorney, Agent, or Firm* — PV IP PC; Wei Te Chung

(57) ABSTRACT

A display panel and a terminal. The display panel includes a liquid crystal array matrix cell, a backlight module, a light guide column, and an electrochromic module. A through hole is formed in the backlight module, and the through hole is used for accommodating the light guide column. The liquid crystal array matrix cell is located on a first side of the backlight module, the electrochromic module is located on a second side of the backlight module, and the first side of the backlight module and the second side of the backlight module are opposite sides.

17 Claims, 2 Drawing Sheets

(58) Field of Classification Search
USPC .................................................. 348/333.01
See application file for complete search history.

(56) References Cited

U.S. PATENT DOCUMENTS

| | | | |
|---|---|---|---|
| 10,866,461 B2* | 12/2020 | Nakamura | G02F 1/13338 |
| 2016/0127629 A1* | 5/2016 | Sun | H04N 23/75 |
| | | | 348/362 |
| 2019/0072822 A1 | 3/2019 | Yasunaga et al. | |
| 2019/0146146 A1* | 5/2019 | Nakajima | G02F 1/133528 |
| | | | 362/611 |
| 2020/0186688 A1* | 6/2020 | Chen | H04N 23/54 |
| 2021/0200020 A1* | 7/2021 | Kim | H04N 23/57 |
| 2021/0242350 A1* | 8/2021 | Li | H10D 30/6713 |
| 2021/0333466 A1* | 10/2021 | Zhou | G02B 6/0055 |
| 2022/0271263 A1* | 8/2022 | Li | H04M 1/0266 |
| 2023/0006180 A1* | 1/2023 | Seo | H10K 59/8722 |

FOREIGN PATENT DOCUMENTS

| | | | | |
|---|---|---|---|---|
| CN | 109218475 A | * | 1/2019 | .......... H04M 1/0266 |
| CN | 208386631 U | | 1/2019 | |
| CN | 110161615 A | | 8/2019 | |
| CN | 110471211 A | | 11/2019 | |
| CN | 110989257 A | | 4/2020 | |
| WO | 2019239861 A1 | | 12/2019 | |
| WO | WO-2020125387 A1 | * | 6/2020 | .......... G06F 1/1637 |

OTHER PUBLICATIONS

Written Opinion of the International Search Authority in international application No. PCT/CN2020/089976, mailed on Jan. 28, 2021.
International Search Report in International application No. PCT/CN2020/089976, mailed on Jan. 28, 2021.
1st Office Action issued in corresponding Chinese Patent Application No. 202010325718.3, dated Dec. 14, 2020, pp. 1-8.

* cited by examiner

DISPLAY PANEL AND TERMINAL

The present application is a US national phase application based upon an International Application No. PCT/CN2020/089976, filed on May 13, 2020, which claims priority Chinese Patent Application No. 202010325718.3, titled "DISPLAY PANEL AND TERMINAL" filed on Apr. 23, 2020 with the China National Intellectual Property Administration, which is incorporated by reference in the present application in its entirety.

FIELD OF INVENTION

The invention relates to the field of display technology, and particularly to a display panel and a terminal.

BACKGROUND

With the continuous development of communication technology, a large number of popularization and application of terminals such as smart phones, tablet computers and notebook computers, terminals are developing in a diversified and personalized direction, and increasingly become indispensable terminals in people's life and work.

Nowadays, mobile phones, tablet computers and other terminals have become electronic devices that people carry with them on a daily basis. The application industry of terminals is developing rapidly, such as game software, video software, work software, etc. Therefore, more and more large-screen touch screen smart phones appear. In the field of terminal display technology, full screen has gradually become one of the main directions of current development. In order to achieve a true full screen, mobile phone manufacturers currently set the front camera of mobile phone as an under-screen camera. In the process of research and practice, inventors of embodiments of the present application found that the current LCD under-screen camera solution adopts a variable transparent electrochromic glass and a traditional backlight composition. The traditional backlight needs to be designed with holes in the corresponding position. When the screen is bright after the opening, the light is emitted from the cross-section of the light guide plate, which will crosstalk into the camera lens and cause light leakage, causing the camera to not be able to image normally. In addition, conventional adhesive-dispensing and backlighting, etc. will have a significant impact on the display effect. A black ring appears in the display panel area corresponding to the camera module, which affects the overall appearance of the terminal.

SUMMARY

Technical Problem

Embodiments of the present application provide a display panel and a terminal to solve the problem that a black ring appears in the display panel area corresponding to the camera module, which affects the overall appearance of the terminal.

Technical Problem

An embodiment of the present application provides a display panel, comprising:

a liquid crystal array matrix box; a backlight module; a reflector; and an electrochromic module, wherein the backlight module is provided with a through hole, the through hole is arranged corresponding to the camera module and is used to accommodate the reflector, the liquid crystal array matrix box is located on a first side of the backlight module, the electrochromic module is located on a second side of the backlight module, and the first side and the second side of the backlight module are opposite sides.

Furthermore, the reflector is a light guide column.

Furthermore, the light guide column is a solid light guide column or a ring-shaped light guide column.

Furthermore, a diameter of the light guide column is smaller than a diameter of the through hole, and a difference between the diameter of the light guide column and the diameter of the through hole ranges from 50 μm to 150 μm.

Furthermore, the light guide column is a solid light guide column, a diameter of the solid light guide column is smaller than a diameter of the through hole, and a difference between the diameter of the solid light guide column and the diameter of the through hole ranges from 50 μm to 150 μm.

Furthermore, a distance between an edge of the solid light guide column and an edge of the through hole ranges from 25 μm to 75 m.

Furthermore, a height of the reflector is determined by a thickness of the backlight module.

Furthermore, the height of the reflector ranges from 0.8 mm to 1.2 mm.

Furthermore, the height of the light guide column ranges from 0.8 mm to 1.2 mm.

Furthermore, the reflector is covered with a reflective coating.

Furthermore, a material of the reflective coating is mirror silver.

Furthermore, a material of the reflector is transparent acrylic material, glass or polycarbonate plastic.

Furthermore, the backlight module includes an incremental film, a diffuser film, a light guide plate, a reflective film, and an iron frame, and the liquid crystal array matrix box, the incremental film, the diffuser film, the light guide plate, the reflective film and the iron frame are stacked in sequence.

Furthermore, a first fixing member is provided on an edge of the through hole, and the electrochromic module is fixedly connected to the backlight module through the first fixing member.

Furthermore, the first fixing member is a double-sided foam tape.

Furthermore, a second fixing member is provided on a side of the reflector, and the reflector and the electrochromic module are fixedly connected by the second fixing member.

Furthermore, the second fixing member is an optical glue.

An embodiment of the present application further provides a display panel, comprising:

a liquid crystal array matrix box; a backlight module; a light guide column; and an electrochromic module, wherein the backlight module is provided with a through hole, the through hole is arranged corresponding to the camera module, and the through hole is used for accommodating the light guide column, the liquid crystal array matrix box is located on a first side of the backlight module, the electrochromic module is located on a second side of the backlight module, and the first side and the second side of the backlight module are opposite sides.

Furthermore, the light guide column is a ring-shaped light guide column, the ring-shaped light guide column includes an inner diameter and an outer diameter, and a distance between the inner diameter of the ring-shaped light guide column and the outer diameter of the ring-shaped light guide column is greater than 0.8 mm.

Furthermore, the outer diameter of the ring-shaped light guide column is smaller than the diameter of the through hole, and a difference between the outer diameter of the ring-shaped light guide column and the diameter of the through hole ranges from 50 µm to 150 m.

Furthermore, the distance between an outer circle of the ring-shaped light guide column and an edge of the through hole ranges from 25 µm to 75 µm.

An embodiment of the present application further provides a terminal, comprising the display panel mentioned above.

Beneficial Effect

The beneficial effect of the present application is that, by arranging a light guide column with reflective coatings in a through hole of a backlight module, the light guide column reflects back the light emitted from the cross-section of each film layer of the backlight module to ensure that there is no or a small amount of light by arranging the light guide columns with a reflective coating in the through hole of the backlight module. The light will string into the light guide column to ensure the normal imaging of the camera module under the screen, which helps to ensure the imaging quality of the camera module. The use of the light guide column to replace the prior art dispensing solution can effectively eliminate the black ring caused by the projection appears in the display panel area corresponding to the through-hole that helps to improve the appearance experience of the terminal.

BRIEF DESCRIPTION OF DRAWINGS

The following detailed description of specific implementations of the present application in conjunction with the accompanying drawings will make the technical solutions and other beneficial effects of the present application obvious.

DETAILED DESCRIPTION

Specific structures and functional details disclosed herein are only representative and are used for the purpose of describing exemplary embodiments of the present application. However, the present application can be implemented in many alternative forms, and should not be construed as being limited only to the embodiments set forth herein.

The terms "first" and "second" in the description and claims of the embodiments of the present invention and the above-mentioned drawings are used to distinguish similar objects and are not necessarily used to describe a specific sequence or sequence. It should be understood that the data used in this way can be interchanged under appropriate circumstances, so that the embodiments described herein can be implemented in an order other than the content illustrated or described herein. The technical solutions in the embodiments of the present invention will be clearly and completely described below in conjunction with the accompanying drawings in the embodiments of the present invention. Obviously, the described embodiments are only a part of the embodiments of the present invention, rather than all the embodiments. Based on the embodiments of the present invention, all other embodiments obtained by those skilled in the art without creative work shall fall within the protection scope of the present invention.

An embodiment of the present invention provides a display panel, which can be used in conjunction with a terminal, such as a smart phone, a tablet computer, a notebook computer, or a personal computer. A display module will be described in detail below. It should be noted that the order of description in the following embodiments is not intended to limit the preferred order of the embodiments.

The present invention will be described in detail below with reference to the drawings and specific embodiments, please refer to FIG. 1 and FIG. 2.

Figure 1:
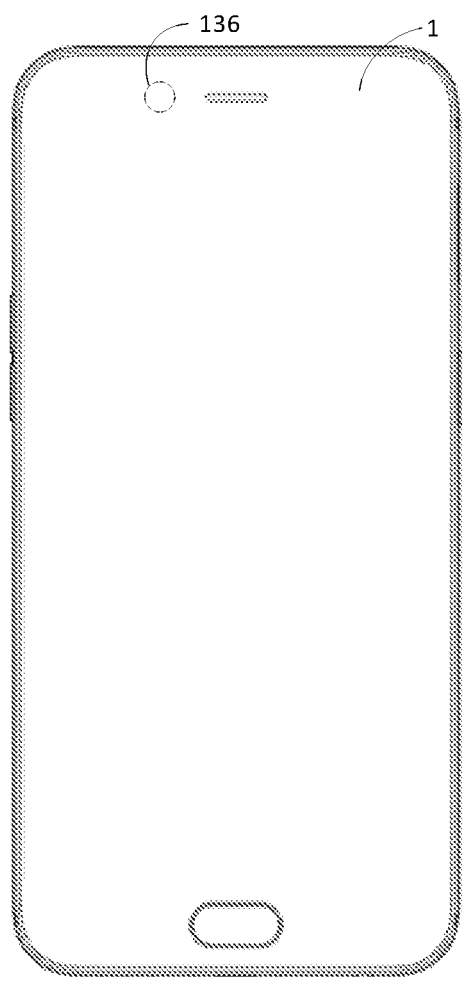
FIG. 1 is a schematic diagram of a structure of a display panel provided by an embodiment of the application.
Figure 2:
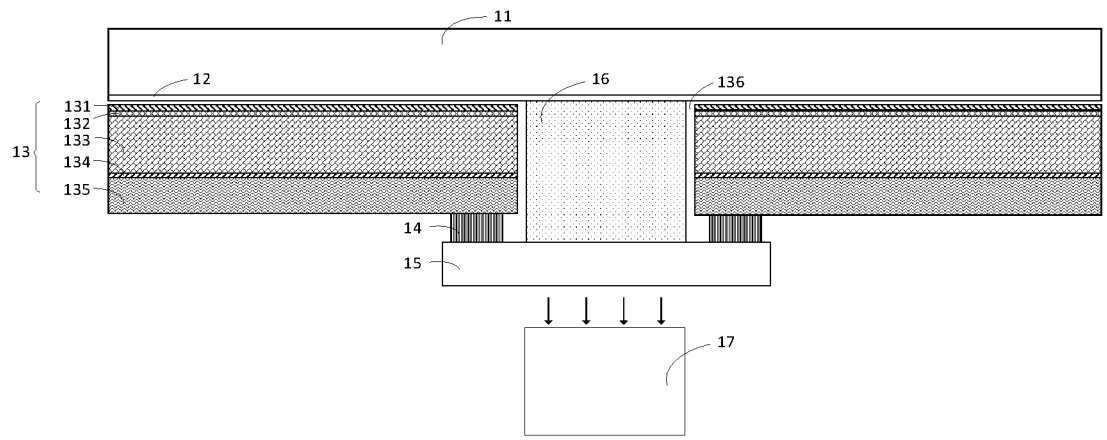
FIG. 2 is a schematic diagram of another structure of a display panel provided by an embodiment of the application.

Please refer to FIG. 1 and FIG. 2, embodiments of the present invention provide a display panel 1. The display panel 1 comprises a liquid crystal array matrix box 11, a backlight module 13, a reflector 16 and an electrochromic module 15. The backlight module 13 is provided with a through hole 136 for accommodating the reflector 16. The liquid crystal array matrix box 11 is located on a first side of the backlight module, and the electrochromic module 15 is located on a second side of the backlight module. The first side of the backlight module and the second side of the backlight module are opposite sides, and the first side of the electrochromic module is fixedly connected to a light guide column, and an area of the electrochromic module is correspondingly provided with a camera module (not shown in the figure). The camera module (not shown in the figure) is located on the second side of the electrochromic module. The first side of the electrochromic module and the second side of the electrochromic module are opposite sides.

Specifically, in an embodiment of the present invention, the reflector 16 may be a light guide column, the light guide column 16 includes a solid cylinder or a ring-shaped cylinder, and the light guide column 16 may be a solid light guide column or a ring-shaped light guide column. A diameter of the light guide column 16 is proportional to a thickness of the backlight module 13. The thicker the thickness of the backlight module 13 is, the larger the diameter of the light guide column 16 is.

Specifically, in an embodiment of the present invention, the diameter of the light guide column 16 is smaller than the diameter of the through hole 136, and a difference between the diameter of the light guide column 16 and the diameter of the through hole 136 ranges from 50 µm to 150 µm. For example, the difference between the diameter of the light guide column 16 and the diameter of the through hole 136 may be 50 µm. The light guide column 16 and the through hole 136 are arranged concentrically, and a distance between an edge of the light guide column 16 and an edge of the through hole 136 ranges from 25 µm to 75 µm. For example, the distance between the edge of the light guide 16 and the edge of the through hole 136 may be 25 µm.

Specifically, in an embodiment of the present invention, the light guide column 16 may be a solid light guide column, the diameter of the solid light guide column 16 is smaller than the diameter of the through hole 136, and a difference between the diameter of the solid light guide column 16 and the diameter of the through hole 136 ranges from 50 µm to 150 µm. For example, the difference between the diameter of the solid light guide column 16 and the through hole 136 may be 50 µm. The solid light guide column 16 and the through hole 136 are arranged concentrically, and a distance between an edge of the solid light guide 16 and an edge of the through hole 136 ranges from 25 μm to 75 μm. For example, the distance between the edge of the solid light guide column 16 and the edge of the through hole 136 may be 30 μm.

Specifically, in an embodiment of the present invention, the light guide column 16 may be a ring-shaped light guide column 16, and the ring-shaped light guide column 16 includes an inner diameter and an outer diameter. A distance between the inner diameter of the ring-shaped light guide column 16 and the outer diameter of the ring-shaped light guide column 16 is greater than 0.8 mm. For example, the distance between and the inner diameter and outer diameter of the ring-shaped light guide column 16 may be 0.9 mm. A diameter of an outer circle of the ring-shaped light guide column 16 is smaller than the diameter of the through hole 136. The difference between the outer diameter of the ring-shaped light guide column 16 and the diameter of the through hole 136 ranges from 50 μm to 150 μm. For example, the difference between the diameter of the ring-shaped light guide column 16 and the diameter of the through hole 136 can be 50 μm. The ring-shaped light guide column 16 the through hole 136 are arranged concentrically, and a distance between the outer circle of the annular light guide column 16 and an edge of the through hole 136 ranges from 25 μm to 75 μm. For example, the distance between the outer circle of the annular light guide column 16 and the edge of the through hole 136 may be 30 μm.

Specifically, in an embodiment of the present invention, a height of the light guide column 16 ranges from 0.8 mm to 1.2 mm. For example, the height of the light guide column 16 may be 0.8 mm. Herein, the height of the light guide column 16 is determined by the thickness of the backlight module 13, and the height of the light guide column 16 is proportional to the thickness of the backlight module 13. The thicker the thickness of the backlight module 13 is, the larger the height of the light guide column 16 is.

Specifically, in the embodiment of the present invention, a side area of the light guide column 16 is covered with a reflective coating, and the reflective coating may be a mirror silver coating.

Specifically, in an embodiment of the present invention, a material of the light guide column 16 may be a transparent acrylic material, glass or polycarbonate plastic.

Specifically, in an embodiment of the present invention, the backlight module 13 includes an incremental film 131, a diffusion film 132, a light guide plate 133, a reflective film 134 and an iron frame 135, and the display panel also includes an upper polarizer (not shown in the figure) and a lower polarizer 12. The liquid crystal array matrix box 11 is located between the upper polarizer (not shown in the figure) and the lower polarizer 12. The liquid crystal array matrix box 11, the upper polarizer (not shown in the figure), the lower polarizer 12, the incremental film 131, the diffusion film 132, the light guide plate 133, the reflective film 134 and the iron frame 135 are stacked in sequence. A first side of the liquid crystal array matrix box the upper polarizer (not shown in the figure) is in contact with a side of the liquid crystal array matrix box, and a second side of the liquid crystal array matrix box is in contact with a first side of the lower polarizer. The first side of the liquid crystal array matrix box and the second side of the liquid crystal array matrix box are opposite sides. A second side of the lower polarizer is in contact with a first side of the light guide column, and the first side of the lower polarizer and the second side of the lower polarizer are opposite sides. A first side of the incremental film is in contact with the first side of the diffusion film, and a second side of the diffusion film is in contact with the first side of the light guide plate. The first side of the diffusion film and the second side of the diffusion film are opposite sides. A second side of the light guide plate is in contact with a first side of the reflective film, and the first side of the light guide plate and the second side of the light guide plate are opposite sides. A second side of the reflective film is in contact with the first side of the iron frame, and the first side of the reflective film and the second side of the reflective film are opposite sides.

Specifically, in the embodiment of the present invention, the electrochromic module 15 may include a transparent upper substrate, a transparent electrode, a liquid crystal layer, and a transparent lower substrate. The upper substrate, the liquid crystal layer, and the lower substrate are stacked in sequence. A light-emitting surface of a light-emitting source is arranged opposite to a non-laminated surface of the liquid crystal layer. Wherein, the transparent electrode provides a deflection electric field, a surface where the upper substrate and the liquid crystal layer are in contact with each other, and a surface where the lower substrate and the liquid crystal layer are in contact with each other are laminated surfaces, and the remaining non-contact surfaces can be called non-laminated surfaces. The electrochromic module 15 has different working modes so that the electrochromic module is used as a backlight source when using the display screen, so that when the camera module 17 is used, the light transmittance of the electrochromic glass is improved, so as to realize a under-screen camera solution where there is no hole in the front surface.

In some embodiments, the camera module 17 is used to obtain images of an external environment. The camera module 17 can realize the shooting function of the terminal 1 through the through hole 136 and the electrochromic module 15.

In some embodiments, there is a gap between the camera module 17 and the electrochromic module 15, and the gap ranges from 0.2 mm to 0.3 mm. For example, the gap between the camera module 17 and the electrochromic module 15 is 0.3 mm.

Specifically, in the embodiment of the present invention, a first fixing member is provided on the edge of the through hole 136, and the electrochromic module 15 is fixedly connected to the backlight module 13 through the first fixing member. The first fixing member may be double-sided foam tape, and the electrochromic module is fixedly connected to the backlight module through the double-sided foam tape.

Specifically, in the embodiment of the present invention, a second fixing member is provided on a side of the light guide column 16, and the light guide column 16 and the electrochromic module 15 are fixedly connected by the second fixing member. The second fixing member may be an optical glue, which is colorless and transparent, has a light transmittance of more than 90%, good bonding strength, can be cured at room temperature or medium temperature, and has the characteristics of small curing shrinkage. In an embodiment of the present invention, for example, the optical glue is used. Since the optical glue is colorless and transparent and has a light transmittance of more than 90%, the light guide column and the electrochromic module are fixedly connected by the optical glue, which can be fixed firmly and it also will not block the shooting of the camera module and will not affect the imaging quality of the camera module.

To sum up, in the embodiment of the present invention, a light guide column with a reflective coating is arranged in the through hole of the backlight module, and the light guide column reflects back the light emitted by cross-sections of each film layer of the backlight module to ensure that there is no or a small amount of light will string into the light guide column to ensure the normal imaging of the under-screen camera module, which helps to ensure the imaging quality of the camera module. The use of a light guide column to replace adhesive dispensing solution in the prior art can effectively eliminate the black ring appearing caused by the through-hole projection in the corresponding display panel area and help to improve the appearance experience of the terminal.

Figure 3:
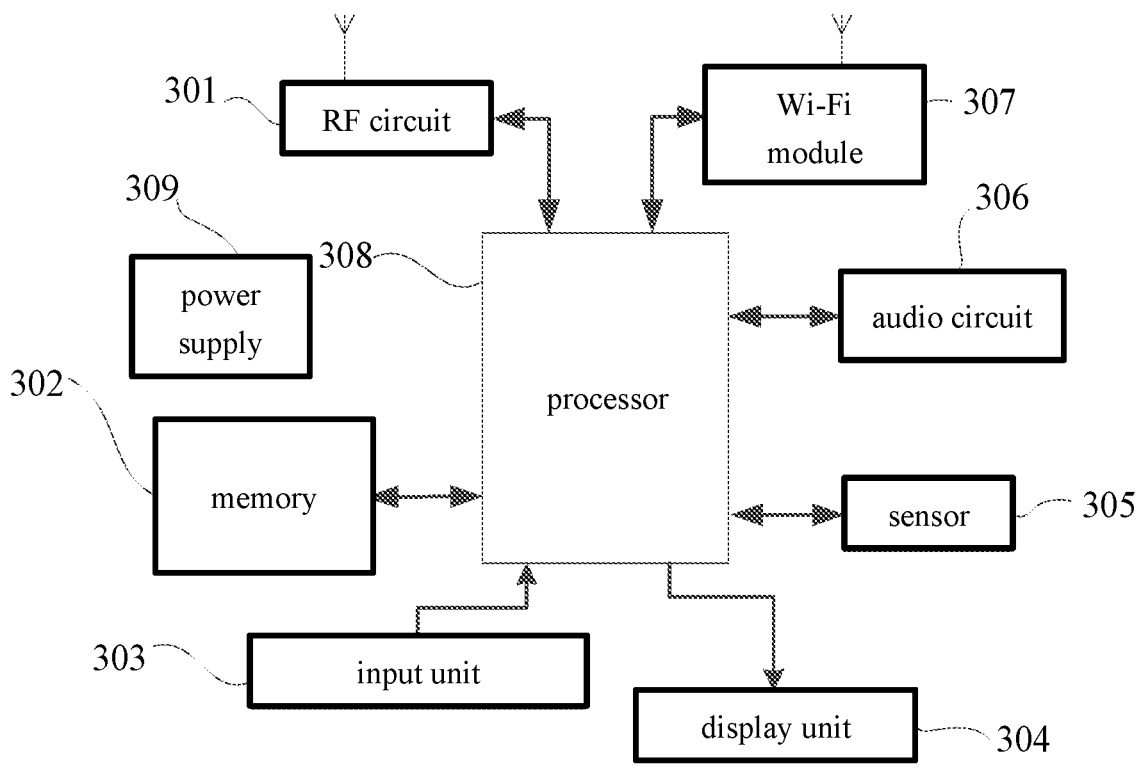
FIG. 3 is a schematic structural diagram of a terminal provided by an embodiment of the application.

A display panel in an embodiment of the present invention is described above, and the terminal device in the embodiment of the present invention is described below from the perspective of hardware processing. The embodiment of the present invention also provides a terminal, as shown in FIG. 3, which shows a schematic structural diagram of the terminal involved in the embodiment of the present invention. The terminal may be a mobile phone, a computer, a digital broadcasting terminal, a messaging device, and a game console, a tablet device, medical equipment, fitness equipment, personal digital assistants, etc.

As shown in FIG. 3, the terminal may include a radio frequency (RF) circuit 301, a memory 302 including one or more computer-readable storage media, an input unit 303, a display unit 304, a sensor 305, an audio circuit 306, a Wireless fidelity (Wi-Fi) module 307, a processor 308 including one or more processing cores, a power supply 309 and other components. Those skilled in the art can understand that the terminal structure shown in FIG. 3 does not constitute a limitation on the terminal and may include more or fewer components than shown in the figure, or a combination of certain components, or different component arrangements.

The RF circuit 301 can be used for receiving and sending signals during information transmission or communication. In particular, after receiving the downlink information of the base station, it is processed by one or more processors 308. In addition, the uplink data is sent to the base station. Generally, the RF circuit 301 includes, but is not limited to, an antenna, at least one amplifier, a tuner, one or more oscillators, and a subscriber identity module (Subscriber Identity Module (SIM) card, transceiver, coupler, low noise amplifier (LNA), duplexer, etc. In addition, the RF circuit 301 can also communicate with the network and other devices through wireless communication. The wireless communication can use any communication standard or protocol, including but not limited to the Global System for Mobile Communications (Global System of Mobile communication (GSM), General Packet Radio Service (GPRS), Code Division Multiple Access (Code Division Multiple Access) Multiple Access, CDMA), Wideband Code Division Multiple Access (WCDMA), Long Term Evolution (Long Term Evolution, LTE), e-mail, short message service (Short Messaging Service, SMS) etc.

The memory 302 may be used to store software programs and modules. The processor 308 executes various functional applications and data processing by running the software programs and modules stored in the memory 302. The memory 302 may mainly include a program storage area and a data storage area. The program storage area may store an operating system, an application program required by at least one function (such as a sound playback function, an image playback function, etc.), etc.; The data created by the use of the terminal (such as audio data, phone book, etc.), etc. In addition, the memory 302 may include a high-speed random-access memory, and may also include a non-volatile memory, such as at least one magnetic disk storage device, a flash memory device, or other volatile solid-state storage devices. Correspondingly, the memory 302 may also include a memory controller to provide the processor 308 and the input unit 303 to access the memory 302.

The input unit 303 can be used to receive inputted digital or character information, and generate keyboard, mouse, joystick, optical or trackball signal input related to user settings and function control. Specifically, in a specific embodiment, the input unit 303 may include a touch-sensitive surface and other input devices. A touch-sensitive surface, also called a touch screen or a touchpad, can collect user touch operations on or near it (for example, the user uses any suitable objects or accessories such as fingers, stylus, etc.) on the touch-sensitive surface or on the touch-sensitive surface. Operation near the surface and drive the corresponding connection device according to the preset program. Optionally, the touch-sensitive surface may include two parts: a touch detection device and a touch controller. Among them, the touch detection device detects the user's touch position, detects the signal brought by the touch operation, and transmits the signal to the touch controller; the touch controller receives the touch information from the touch detection device, converts it into contact coordinates, and then sends it to the processor 308, and can receive and execute the commands sent by the processor 308. In addition, multiple types such as resistive, capacitive, infrared, and surface acoustic waves can be used to realize touch-sensitive surfaces. In addition to the touch-sensitive surface, the input unit 303 may also include other input devices. Specifically, other input devices may include, but are not limited to, one or more of a physical keyboard, function keys (such as volume control buttons, switch buttons, etc.), trackball, mouse, and joystick.

The display unit 304 can be used to display information input by the user or information provided to the user and various graphical user interfaces of the terminal. These graphical user interfaces can be composed of graphics, text, icons, videos, and any combination thereof. The display unit 304 may include a display screen. Optionally, a liquid crystal display (LCD), an organic light emitting diode (OLED) and other forms to configure the display. Further, the touch-sensitive surface may cover the display screen. When the touch-sensitive surface detects a touch operation on or near it, it is transmitted to the processor 308 to determine the type of the touch event, and then the processor 308 displays the display according to the type of the touch event. Corresponding visual output is provided on the screen. In the embodiment of the present invention, the display unit is a display panel, and the display panel includes: a liquid crystal array matrix box, a backlight module, a light guide column, and an electrochromic module. The backlight module is provided with a through hole, so the through hole is used to accommodate the light guide column, the liquid crystal array matrix box is located on the first side of the backlight module, the electrochromic module is located on the second side of the backlight module, and the backlight module The first side and the second side of the backlight module are opposite sides. The backlight module includes a lower polarizer, an incremental film, a diffusion film, a light guide plate, a reflective film, and an iron frame. The liquid crystal array matrix box, the lower polarizer, the incremental film, the diffusion film, the light guide plate, the reflective film and the iron frame are laminated and arranged in sequence. The edge of the through hole is provided with a first fixing member, the electrochromic module is fixedly connected to the backlight module through the first fixing member; a second fixing member is provided on one side of the light guide column, the light guide column and the electrochromic module are fixedly connected by the second fixing member.

The terminal may also include at least one sensor 305, such as a light sensor, a motion sensor, and other sensors. Specifically, the light sensor may include an ambient light sensor and a proximity sensor, where the ambient light sensor can adjust the brightness of the display screen according to the brightness of the ambient light, and the proximity sensor can turn off the display screen and/or backlight when the terminal is moved to the ear. As a kind of motion sensor, the gravity acceleration sensor can detect the magnitude of acceleration in each position (usually three-axis) and can detect the magnitude and position of gravity when it is stationary. It can be used to identify mobile phone posture applications (such as horizontal and vertical screen switching, related Games, magnetometer posture calibration), vibration recognition related functions (such as pedometer, percussion), etc. As for other sensors such as gyroscopes, barometers, hygrometers, thermometers, infrared sensors, etc. that can be configured on the terminal, no more details are discussed herein.

The audio circuit 306, speakers, and microphones can provide an audio interface between the user and the terminal. The audio circuit 306 can transmit the electric signal after the conversion of the received audio data to the speaker, which is converted into a sound signal for output by the speaker; on the other hand, the microphone converts the collected sound signal into an electric signal, which is received by the audio circuit 306 and then converted The audio data is processed by the audio data output processor 308, and then sent to, for example, another terminal via the RF circuit 301, or the audio data is output to the memory 302 for further processing. The audio circuit 306 may also include an earplug jack to provide communication between a peripheral earphone and the terminal.

Wi-Fi is a short-distance wireless transmission technology. Through the Wi-Fi module 307, the terminal can help users send and receive emails, browse web pages, and access streaming media. It provides users with wireless broadband Internet access. Although FIG. 3 shows the Wi-Fi module 307, it is understandable that it is not a necessary component of the terminal and can be omitted as needed without changing the essence of the invention.

The processor 308 is the control center of the terminal. It uses various interfaces and lines to connect various parts of the entire mobile phone. Various functions of the terminal and processing data, so as to monitor the mobile phone as a whole. Optionally, the processor 308 may include one or more processing cores; preferably, the processor 308 may integrate an application processor and a modem processor, where the application processor mainly processes the operating system, user interface, application programs, etc. The modem processor mainly deals with wireless communication. It can be understood that the foregoing modem processor may not be integrated into the processor 308.

The terminal also includes a power source 309 (such as a battery) for supplying power to various components. Preferably, the power source may be logically connected to the processor 308 through a power management system, so that functions such as charging, discharging, and power management are realized through the power management system. The power supply 309 may also include any components such as one or more DC or AC power supplies, a recharging system, a power failure detection circuit, a power converter or inverter, and a power status indicator.

Although not shown, the terminal may also include a camera, a Bluetooth module, etc., which will not be described here. Specifically, in this embodiment, the processor 308 in the terminal loads the executable file corresponding to the process of one or more application programs into the memory 302 according to the following instructions, and the processor 308 runs and stores the executable file in the memory. 302 in the application program, so as to achieve various functions.

In the above-mentioned embodiments, the description of each embodiment has its own emphasis. For parts that are not described in detail in an embodiment, reference may be made to related descriptions of other embodiments. The embodiments described above are only a part of the embodiments of the present invention, rather than all the embodiments. Based on the embodiments of the present invention, all other embodiments obtained by those skilled in the art without creative work, except for such designs consistent with the embodiments of the present invention mentioned in the embodiments of the present invention, belong to the present invention. The scope of protection.

The above is a detailed introduction to a display panel and a terminal provided by the embodiments of the present invention. Specific examples are used in this article to explain the principles and implementations of the present invention. The descriptions of the above embodiments are only used to help understand the present invention. Technical solutions and their core ideas; those of ordinary skill in the art should understand that they can still modify the technical solutions recorded in the foregoing embodiments, or equivalently replace some of the technical features; and these modifications or replacements are not the essence of the corresponding technical solutions deviates from the scope of the technical solutions of the embodiments of the present invention.

What is claimed is:

1. A display panel, comprising:
a liquid crystal array matrix box;
a backlight module;
a reflector; and
an electrochromic module,
wherein the backlight module is provided with a through hole, the through hole is arranged corresponding to the electrochromic module and is used to accommodate the reflector, the liquid crystal array matrix box is located on a first side of the backlight module, the electrochromic module is located on a second side of the backlight module, and the first side and the second side of the backlight module are opposite sides,
wherein the reflector is a light guide column, a diameter of the light guide column is smaller than a diameter of the through hole, and a difference between the diameter of the light guide column and the diameter of the through hole ranges from 50 μm to 150 μm.

2. The display panel according to claim 1, wherein the light guide column is a solid light guide column or a ring-shaped light guide column.

3. The display panel of claim 1, wherein the light guide column is a solid light guide column, a diameter of the solid light guide column is smaller than a diameter of the through hole, and a difference between the diameter of the solid light guide column and the diameter of the through hole ranges from 50 μm to 150 μm.

4. The display panel of claim 3, wherein a distance between an edge of the solid light guide column and an edge of the through hole ranges from 25 μm to 75 μm.

5. The display panel of claim 1, wherein a height of the reflector is determined by a thickness of the backlight module.

6. The display panel of claim 1, wherein the height of the reflector ranges from 0.8 mm to 1.2 mm.

7. The display panel of claim 1, wherein the reflector is covered with a reflective coating.

8. The display panel of claim 7, wherein a material of the reflective coating is mirror silver.

9. The display panel of claim 1, wherein a material of the reflector is transparent acrylic material, glass or polycarbonate plastic.

10. The display panel of claim 1, wherein a first fixing member is provided on an edge of the through hole, and the electrochromic module is fixedly connected to the backlight module through the first fixing member.

11. The display panel of claim 10, wherein the first fixing member is a double-sided foam tape.

12. The display panel of claim 1, wherein a second fixing member is provided on a side of the reflector, and the reflector and the electrochromic module are fixedly connected by the second fixing member.

13. The display panel of claim 12, wherein the second fixing member is an optical glue.

14. A display panel, comprising:
a liquid crystal array matrix box;
a backlight module;
a light guide column;
and an electrochromic module,
wherein the backlight module is provided with a through hole, the through hole is arranged corresponding to the electrochromic module, and the through hole is used for accommodating the light guide column, the liquid crystal array matrix box is located on a first side of the backlight module, the electrochromic module is located on a second side of the backlight module, and the first side and the second side of the backlight module are opposite sides,
wherein the light guide column is a ring-shaped light guide column, the ring-shaped light guide column includes an inner diameter and an outer diameter, and a distance between the inner diameter of the ring-shaped light guide column and the outer diameter of the ring-shaped light guide column is greater than 0.8 mm.

15. The display panel of claim 14, wherein the outer diameter of the ring-shaped light guide column is smaller than the diameter of the through hole, and a difference between the outer diameter of the ring-shaped light guide column and the diameter of the through hole ranges from 50 μm to 150 μm.

16. The display panel of claim 15, wherein the distance between an outer circle of the ring-shaped light guide column and an edge of the through hole ranges from 25 μm to 75 μm.

17. A terminal, comprising the display panel of claim 1.

* * * * *